Figure 1:
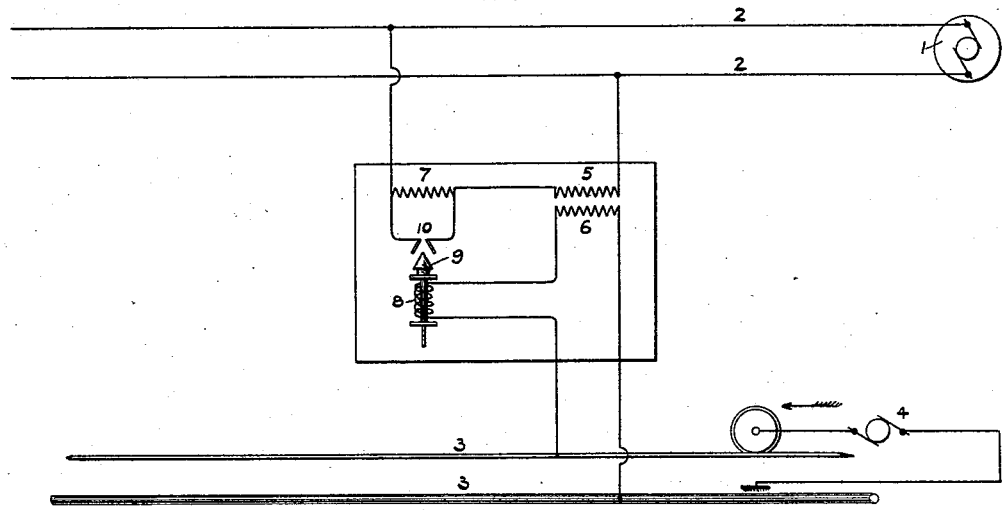

(No Model.)

C. F. SCOTT.
CONVERTER SYSTEM FOR ELECTRIC RAILWAYS.

No. 532,593. Patented Jan. 15, 1895.

WITNESSES:
George Brown
Hubert O. Gener

INVENTOR
C. F. Scott
BY
Terry & MacKaye
ATTORNEYS.

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF SAME PLACE.

CONVERTER SYSTEM FOR ELECTRIC RAILWAYS.

SPECIFICATION forming part of Letters Patent No. 532,593, dated January 15, 1895.

Application filed July 31, 1893. Serial No. 482,029. (No model.)

*To all whom it may concern:*

Be it known that I, CHARLES F. SCOTT, a citizen of the United States, residing in Pittsburg, in the county of Allegheny, State of Pennsylvania, have invented a new and useful Improvement in Potential Controllers for Electric-Railway Systems, (Case No. 561,) of which the following is a specification.

My invention has relation to improvements in the general type of electric railways set forth in patent to George Westinghouse, Jr., No. 404,139, dated May 28, 1889, wherein alternating currents of high potential are generated at the power station and fed to properly placed converters wherein the potential of this current is reduced and the secondary circuits are employed for driving motors upon the car.

My present invention is particularly designed for use with that modification of the above described system wherein the motor on the car is fed from sectional working conductors in circuit with the secondaries of the converter, each section having its own separate converter or converters.

My invention, specifically considered, is an improvement on the construction and arrangement set forth and claimed in an application having the same title as this application, filed by George Westinghouse, Jr., and Charles F. Scott, Case No. 560, Serial No. 482,028, filed July 31, 1893.

The object of my invention is the provision of means whereby the sectional conductors when not employed in feeding the car motors may be safely supplied with an extremely low potential, and whereby when said motors are being fed from any given section of working conductor the potential supplied thereto may be raised gradually above that supplied when the conductors are not in use. By these means the leakage under normal circumstances is greatly reduced, and particularly in those cases wherein the return is through the rails or the earth.

Another object of my invention is the provision of means whereby the iron losses in the converters used as above may be reduced to a minimum.

The specific object of my invention is the provision of a current resisting device to be used in the system set forth in the above application of Westinghouse and Scott, which device, while reducing very greatly the potential on the primary of the working converters for each section when the secondaries of such converters are open, will nevertheless maintain sufficient potential when the motor first enters the section and closes the secondary, to reliably operate the short-circuiting coil.

My invention is illustrated in the accompanying drawings, wherein—

Figure 2:
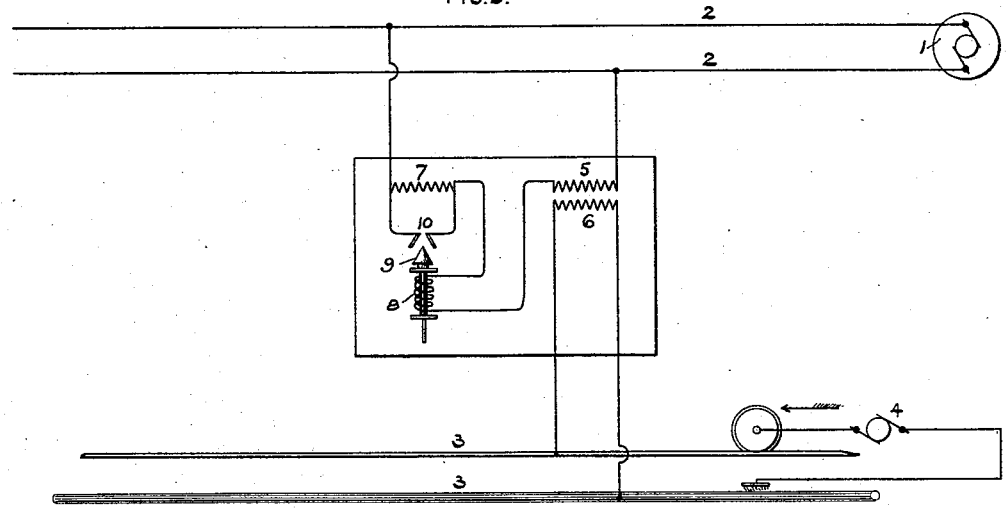

Figure 1 is a diagram showing the general system set forth in the application of Westinghouse and Scott above named, and provided with my improved current resisting device. Fig. 2 is a similar diagram showing slightly modified circuits.

In this specification I will first shortly explain the general system set forth in the Westinghouse and Scott application, and then explain the advantages and mode of construction of my improvement.

In the drawings alternating current generators or other sources of alternating current are shown at 1. These generators feed a main circuit, 2, designed to be laid along the railway in any desired relation to the ground and preferably highly insulated and carrying current of high tension.

At 3 are shown the working conductors, which, as indicated, may be a trolley conductor in any desired relation to the ground and one or more rails; and at 4 is shown the motor supplied from these conductors and supposed to be upon the car. These cars may be supposed for convenience to be moving in the direction of the arrow.

At 5 is shown the primary of a working converter connected to the mains 2 and supplying current by induction to the secondary 6, which feeds the motors on the cars. This converter is merely shown in diagram, without any indication as to the ratio of conversion and as to whether a step-up or step-down converter is used. Of course in practice this converter will preferably be a step-down converter supplying comparatively low tension to the motor on the car.

In order to avoid leakage and danger of shocks when the motor is not on a section it is desirable that an exceptionally low potential should be produced in the secondary during such time, and it is the object of the system set forth in the Westinghouse and Scott application to secure this low potential. The method whereby this result is obtained is the placing in series with the primary 5 of a current resisting device 7, whereby the total potential on the line is divided between the primary and said current resisting device, and the potential on the primary itself is thus greatly reduced. For the purposes of this specification I will suppose that such potential on the primary is reduced to one half, although, as will be understood, this ratio may be whatever desired.

Preferably in series with the secondary, 6, is a magnetizing coil 8, actuating a short-circuiting device or bridging piece 9, which is adapted to be raised by the magnetism of the coil 8, so as to close the circuit 10 around the device 7 by means of the bridging piece 9 and thus increase the potential on the converter 5, 6. When the car enters upon the section connected to the secondary, 6, sufficient current flows through the coil 8 to close the short-circuit 10, as above indicated and thus increase the potential delivered to the car.

The device 9 is adapted to open the circuit 10 automatically when the car leaves the section 3 either by its own weight or by any auxiliary device, such as a spring. This detail can, of course, be left to the judgment of any mechanic.

Upon considering the quantitative relations of this system, it will be seen that the short-circuiting device 9, must be so adjusted as to close the circuit 10, under the influence of the reduced potential on the secondary when the car first enters the section, and still must not maintain the circuit 10 closed under the full working potential in said secondary when the car leaves the section. In the first instance the circuit through the coil 8 will include the resistance of the car motor and be supplied at the reduced potential; while on the other hand in the second case the resistance in the circuit including the coil 8 will be much greater, but the potential tending to drive current through it will be also much greater. It is important that the margin between the currents produced through the coil 8 under these two conditions should be as great as possible in order that the short-circuiting device should act with perfect certainty.

The nature of the current resisting device 7 will be very important in its relation to this margin between the current passing when the car comes on and when it goes off a given section. It is evident that in order to keep this margin as large as possible, there should be as high a potential as possible on the coil 8 when the car enters the section in order that the current under these conditions may be materially greater than any leakage current which might pass through the coil 8 under working potential, which exists when the car goes off the section. It is the object of my invention to supply means whereby the potential may be maintained as high as possible when the car first enters the section and the short-circuiting device thus actuated with certainty. If the current resisting device 7 be a mere ohmic resistance in series with the primary 5, it is evident that on short-circuiting the secondary 6, and thus gradually lowering the counter electromotive force in the primary 5, almost the whole of the potential of the mains 2 will be thrown upon the terminals of the ohmic resistance 7.

Supposing the potential of the mains to be a thousand volts and the potential on the primary 5 and the resistance 7 with open secondary to be five hundred volts each, then on short-circuiting the secondary, the effect will be to reduce the resistance of the converter to the primary current to practically zero, so that practically the full potential is thrown upon the resistance. This doubles the current through the primary circuit and makes it about equal to what the current would be if the converter itself be connected directly to the line with an open secondary. If the permanent magnetizing current through the transformer on open circuit be, say, ten per cent. of the current at full load, then the current through the secondary on short-circuit with the current resisting device as above described will be but ten per cent. of its maximum value. When a car comes upon a section fed by the converter, there would probably be some resistance in the motor circuit, so that the secondary would not be completely short-circuited. This would tend still further to reduce the current, and consequently the amount of current through the secondary is extremely small compared to a full load current and may not be much greater than leakage current at working potential when the car goes off the section. This, of course, makes operation of the short-circuiting device uncertain.

What is above stated with regard to the use of an ohmic resistance is approximately true where a choking coil is employed having an unsaturated core which remains unsaturated on closing the secondary circuit. If, however, the current resisting device 7 be a choking coil having the iron of the core so proportioned and related to the magnetizing power of its coil that while such core is unsaturated with an open secondary 6 any material increase of current due to closing the secondary 6 will saturate said core, the disadvantages above noted may be to a great extent obviated. The result of using a choking coil of this nature will be that while it might be used in series with the primary 5 on a thousand volt circuit so as to admit the passage of one ampère while depriving the primary 5 of half the full voltage of five hundred volts, a small rise in the potential at the terminals of such choking coil and a consequent fall in potential at the terminals of 5 would imply a great rise in current passed, say, from one ampère to fourteen or fifteen ampères. If the converter 5 6, therefore, were a step-down converter, a very considerable current would be passed in spite of any fall of counter electromotive force occurring at the terminals of the primary 5 due to closing the secondary 6. The magnetizing force actuating the short-circuiting device would, therefore, be greatly increased and the object of my invention therefore attained.

I have shown in Fig. 2 a modification of my invention in which the coil 8 is connected in series with the primary of the converter.

The details of my invention as above illustrated and described are susceptible of many and various modifications without departing from the spirit of my invention, and I do not desire to be understood as limiting myself to the precise construction shown.

It is also evident that my invention is not confined to use in electric railways, but is adapted to produce the various electrical effects above set forth in connection with any tanslating devices where such effects may be desirable.

What I claim is—

1. An alternating current feeding circuit, a working converter fed thereby, a choke coil in series with the primary thereof, and a normally open short-circuit around said choke coil, a bridge for closing said short-circuit and electrical means for operating said bridge in series with one of the coils of said working converter, said choking coils being so proportioned as to be unsaturated when the secondary is open and saturated when it is closed under normal conditions, substantially as described.

2. An alternating current feeding circuit, a working converter fed thereby, a choke coil in series with the primary thereof, and a normally open short-circuit around said choke coil, a bridge for closing said short-circuit and electrical means for operating said bridge in series with the secondary of said working converter, said choking coil being so proportioned as to be unsaturated when the secondary is open and saturated when it is closed under normal conditions, substantially as described.

3. An alternating current feeding circuit, a working converter fed thereby, a choke coil in series with the primary thereof, and a normally open short-circuit around said choke coil, a solenoid in circuit with the secondary of said working converter, and within said solenoid a core bearing a bridging piece and adapted upon passage of sufficient current through said solenoid to close said short-circuit, said choking coil being so proportioned as to be unsaturated when the secondary is open and saturated when it is closed under normal conditions.

In testimony whereof I have hereunto subscribed my name this 15th day of July, A. D. 1893.

CHAS. F. SCOTT.

Witnesses:
JAMES WM. SMITH,
HUBERT C. TENER.